Patented July 1, 1924.

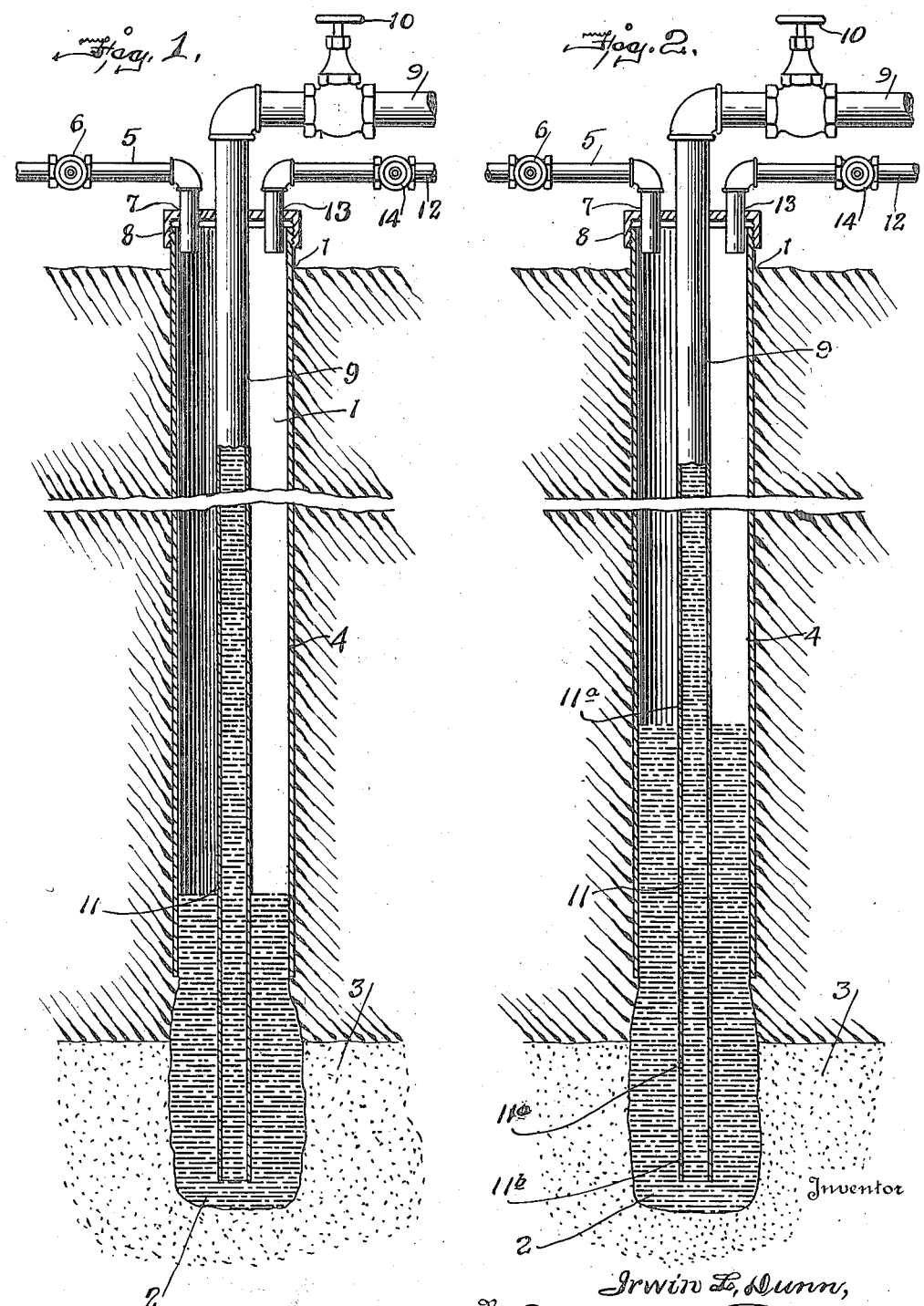

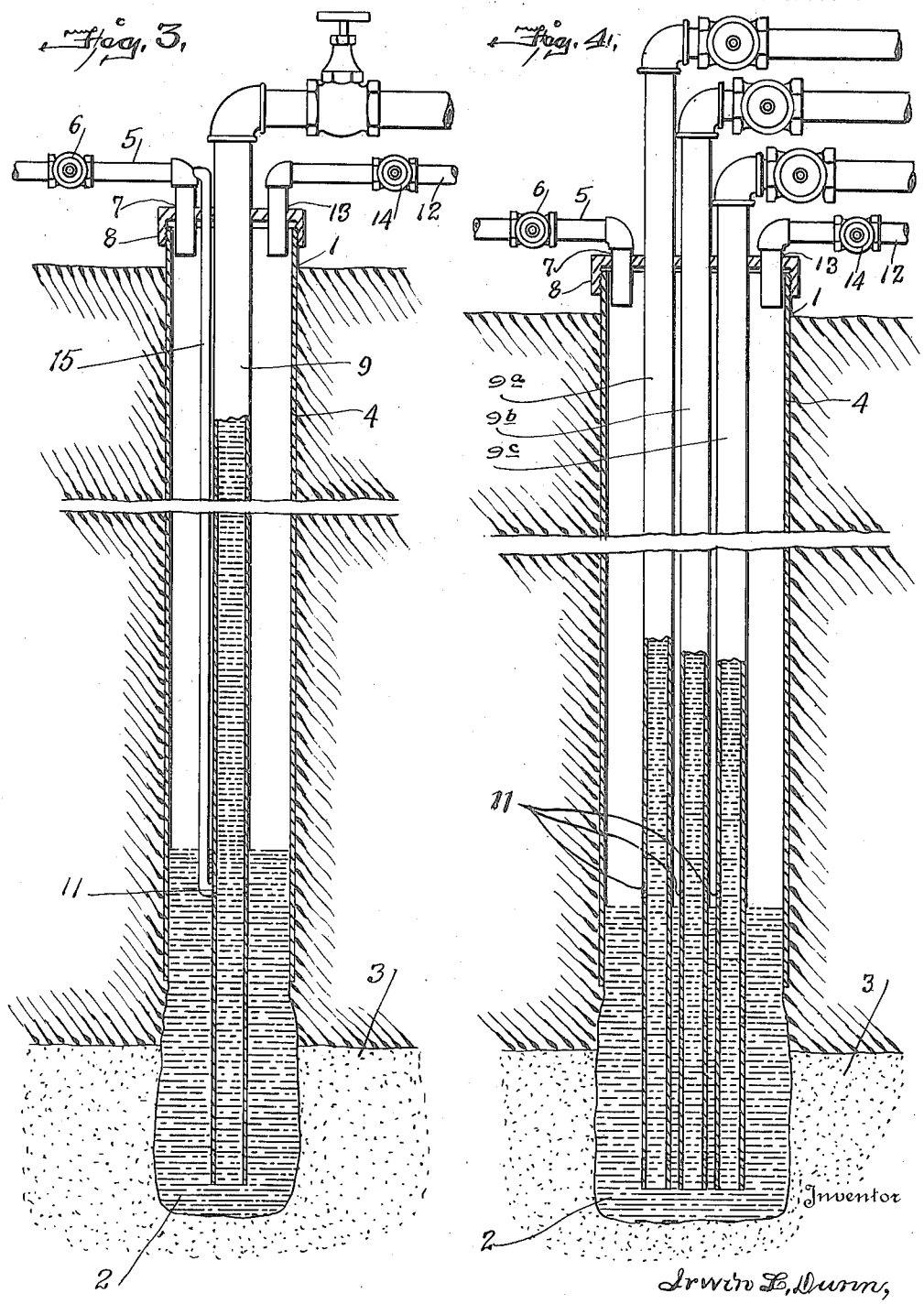

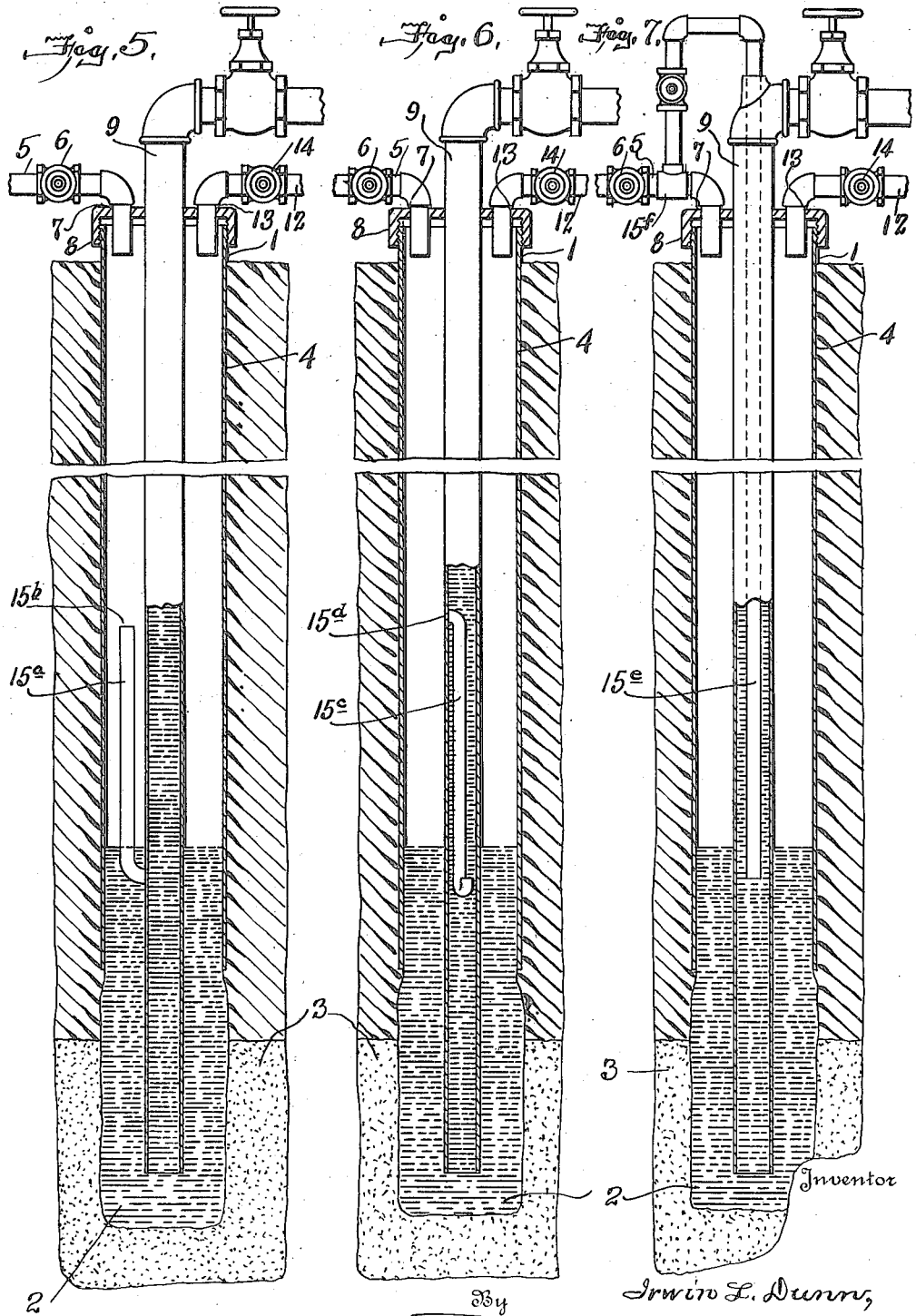

1,499,509

UNITED STATES PATENT OFFICE.

IRWIN L. DUNN, OF MARIETTA, OHIO.

METHOD OF AND APPARATUS FOR REMOVAL OF FLUIDS FROM WELLS.

Application filed October 19, 1922. Serial No. 595,526.

*To all whom it may concern:*

Be it known that I, IRWIN L. DUNN, a citizen of the United States, residing at Marietta, in the county of Washington and State of Ohio, have invented certain new and useful Improvements in Methods of and Apparatus for Removal of Fluids from Wells, of which the following is a specification, reference being had therein to the accompanying drawing.

This invention relates to an improved method of, and apparatus for, the removal or drawing off of fluids from wells, as oil or water.

The invention consists, essentially, of a method in which and an apparatus by which, a fluid under pressure is introduced into the oil well and divided into a major portion which shall act by pressure upon the body of the oil or other liquid to cause it to rise in a discharge conduit or pipe, and a minor portion which shall enter such discharge conduit or pipe and exert a lifting action on the oil, or other liquid, whereby I have obtained in actual practice in many oil wells a combined displacement of the oil in the well and a lifting action on the column of oil undergoing expulsion.

Another object of my invention is to utilize the fluid in accelerating the flow of oil from the oil stratum where the stratum is of such a character as will admit of the fluid under pressure entering the interstices thereof and then flowing back into the well pit when the pit has been substantially emptied and further supplies of the fluid are cut off. I have found that under these conditions the action of the pressure medium in the interstices when relieved of further pressure is to exert itself to return through the interstices to the well pit and in doing so to rapidly take with it substantial quantities of oil that would otherwise be inert or depend upon the accident of natural pressure to cause them to flow to the pit, and then in a more sluggish manner. This also clears the interstices of paraffin and other obstructive materials.

The term "fluid" with reference to the medium which is to be introduced into the well under pressure must be understood as including any suitable medium, such as air, steam or gas.

In the accompanying drawings:

Fig. 1 is a vertical sectional view of an oil well and an apparatus applied thereto by which my method may be carried into effect and which is one embodiment of the apparatus constituting that branch of my invention;

Fig. 2 is a like view showing a modification with respect to a plurality of, instead of a single, points of division of the pressure medium into the major and minor quantities;

Fig. 3 is another similar view showing a modification in respect of the means for conveying the minor portion of the pressure fluid to the point of entrance into the discharge pipe;

Fig. 4 is a further similar view showing a plurality of discharge pipes instead of one, as in the other figures;

Fig. 5 is a further similar view showing another modification;

Fig. 6 is a like view showing a further modification;

Fig. 7 is another like view showing an additional modification.

I will first describe the apparatus branch of my invention, both with respect to the main or preferred form shown in Fig. 1 and the modifications shown in the other figures.

The numeral 1 designates an oil well, such as is commonly provided for obtaining oil from oil strata in the earth. The pit of the well is shown at 2 and the surrounding oil stratum indicated by the numeral 3. Such wells are usually lined with a casing, as indicated at 4. My invention has to do with removing oil from the pit of the well, (the lower portion where it gathers) and incidentally in aiding the drawing of the oil from the oil producing stratum, as before stated.

To this end I equip the well with a pressure medium supply pipe 5 having a control valve 6 and connected with any suitable source of supply, say with an air compressor pump or air tank or steam boiler, and fitted at 7 to the well cap 8 to discharge the pressure medium into the well and against the surface of the oil. The pressure of the fluid acting against the surface of the oil depresses the latter in the well and lifts it within the discharge pipe 9. This pipe extends to near the bottom of the well pit and passes up through the well and out of the cap 8 and thence to the place where the oil is to be discharged. A control valve is inserted in this pipe line to open and close the pipe as occasion may require, as will presently appear.

Down within the well the discharge pipe 9 has an opening 11 through which a minor portion of the pressure fluid will enter, the major portion remaining in the well and acting on the body of oil. Through this hole or orifice 11 this minor portion of the pressure medium passes into the discharge pipe 9 and against the oil therein. In practice I have found that as the tendency of this minor stream of pressure medium is to escape in the direction of least resistance it moves upward against the superimposed column or quantity of oil in the discharge pipe and creates a lifting force which hastens the upward movement of the oil through the pipe, and acts as an air-lift which raises the oil or other liquid to a much higher level than is possible with merely a displacement system. The air enters the discharge pipe and is incorporated into the column of oil or water either as a multitude of bubbles or by separating the column into lengths or sections of oil with air between them. In this way the column of fluid is greatly lightened. I have found that in raising heavy salt water with, say, a pressure of 100 pounds, while it would rise under displacement pressure some 200 feet from the bottom of the well into the discharge pipe, with the feature of the opening the same fluid can be raised an additional 600 feet above the opening.

Thus the major portion of the pressure fluid and this minor portion coact to the common end of the effective and rapid discharge of the oil from the well to the place of delivery. As the major portion of the medium displaces the body of oil in the well it elevates the oil in the discharge pipe, while the minor portion forming a forceful air jet, finding its effort to escape least opposed in an upward direction joins in the upward movement of the oil in the pipe and hastens its ascent in a manner which in practice has proved highly useful and satisfactory in the rapid delivery of the contained quantities of oil in the well to the place of discharge above ground.

A pressure medium escape pipe is shown at 12. This pipe opens into the well by being fitted to the cap 8 at the point 13 and is equipped with a control valve 14 by which the pipe may be opened or closed.

Oil will stand in some wells at about one depth and in other wells at a greater or less depth from the bottom, according to the conditions of supply. Thus the contained quantity of oil will vary in different wells. The height to which the major portion of the pressure medium will lift the oil in the discharge pipe will vary according to the quantity of oil that will normally stand in the well and its specific gravity. For instance, when a given quantity is displaced in the well it will rise in the discharge pipe. If the supply is normally high in the well it will rise a relative height in the discharge pipe. If the supply is low in the well it will rise a relative height to this supply, because in either case the extent of the rise in the discharge pipe depends upon the initial quantity in the well. When my apparatus is fitted for a particular well it is usual to ascertain substantially the normal depth of oil in the well. Then the location of the orifice in the discharge pipe is determined. Such location must be below the minimum level to which the oil will rise in the discharge pipe by the displacement action in the well of the major portion of the pressure medium. The distance of the orifice below such level will vary with the depth of the well, usually several feet below the level of the oil will produce the effective result. This is the essential formula for locating the position of the orifice for the entrance of the minor portion of the pressure medium into the discharge pipe. The effective action of the minor portion of the pressure medium will result. The object in this location of the orifice is to insure the presence of more or less oil above the orifice so that when the apparatus is started in operation and the pressure medium has acquired sufficient pressure in the casing, the coaction of the air jet will be prompt and instant, as well as continuous, in acting upwardly on the oil.

When the apparatus is to be put in operation the valve 6 is opened to permit the pressure medium to enter the well. The valve 14 is closed to prevent the fluid from escaping. The valve 10 is opened to permit the oil to discharge. After the accumulated supply of oil in the well has been substantially exhausted, and it is necessary to wait until another accumulation forms in the well, then the valve 6 is closed to prevent the further supply of pressure medium and the valve 14 is opened to allow the escape of any pressure medium in the well. The valve 10 will also be open to permit the thorough escape of any of the minor portions of the pressure medium.

It will further be understood that whenever the oil level in the well is below the productive stratum 3 portions of the pressure medium will enter the interstices in the stratum. When the further supply of the pressure medium is stopped the medium in the interstices will return to the well pit and carry with it or induce to flow after it additional quantities of oil which otherwise would not flow into the pit or would be very slow in doing so. In other words, this oil-flow producing reaction of the pressure medium increases and hastens the flow from the productive stratum to the well pit.

Referring to the modification shown in Fig. 2 it will be seen that in addition to the orifice 11 I provide orifices 11$^a$ and 11$^b$ for injecting more of the pressure medium into the discharge pipe and thus further assisting in the upward flow of the oil. But at least one of these orifices, preferably the orifice 11, should be located according to the formula above stated. Of course, the total of the minor portion of the pressure medium must be materially and essentially less than the quantity which acts upon the surface of the oil in the well.

Instead of one orifice 11, or 11$^a$ or 11$^b$, I may use more than one opening at about the same point; that is, instead of having one opening, say one-quarter inch in diameter, there may be, say sixteen openings each one-eighth inch in diameter.

Referring to Fig. 3 it will be seen that I have introduced another modification in the means by which the minor quantity of pressure medium is to be introduced into the discharge pipe. Instead of introducing it from the well casing directly into the discharge pipe, as in the other figures, I employ a small pressure pipe 15 connected at one end to the pressure supply pipe 5 and at the other end to the discharge pipe 9 at the orifice 11. But the function performed is unmodified, the only purpose in using the pipe 15 being to introduce the air into the pipe at a point below the depth to which the air would pass through the oil and reach the orifice, as when it was desirable to introduce the air into the discharge pipe, say 40 or 50 feet below the normal level of the oil.

Referring to Figs. 5, 6 and 7 it will be seen that I have shown other modifications of the manner in which I have applied the small pressure pipe designated 15 in Fig. 3. In these latter modifications I have shown this small pressure pipe, in Fig. 5, where I designate it 15$^a$, terminated at some suitable point, say 15$^b$, instead of carrying it all the way up the casing for direct connection with the pressure medium pipe 5. Any convenient point above the level to which the oil will ever rise in the casing may be the point for the termination of this pipe 15$^a$. In Fig. 5 such pipe is within the casing but outside of the discharge pipe 9.

In Fig. 6 I have shown this pipe at 15$^c$ within the discharge pipe, but otherwise the same as in Fig. 5, as it connects with the discharge pipe 9 and terminates at its upper end in the same manner as in Fig. 5, except that in Fig. 6 the upper end of the small pipe communicates with the casing through an orifice 15$^d$ in the pipe 9.

In Fig. 7 I have located this small pressure pipe indicated at 15$^e$ not only within the discharge pipe 9, as in Fig. 6, but have extended it all the way up through the discharge pipe connecting at the point 15$^f$ with the cap 8 of the casing 1.

Referring to the other modification shown in Fig. 4 it will be seen that instead of using one discharge pipe 9 I use a series of discharge pipes 9$^a$, 9$^b$ and 9$^c$, as in unusually large wells. Otherwise, the structure in this modification is the same as that in Fig. 1.

I find it advantageous to stop the inflow of the pressure medium into an oil well before the chamber or pocket of the well has been completely emptied, because in this way the formation of emulsions of oil and water is minimized.

Ordinarily I employ the pressure medium, except in the case of steam, at the temperature of the atmosphere, but I find that it is advantageous at times to heat this inflowing medium, thereby aiding in the cleaning of paraffin, sediments, sand and other obstructive materials from the pores of the producing stratum adjacent to the well.

Referring again to the action of the pressure medium in entering the interstices or pores of the producing stratum I would further remark that the reaction of this medium clears the pores of paraffin, sediments, sand and other obstructive materials, as well as forces oil or water from the pores into the well pocket. This is a material feature of my invention by which I have increased the daily productions of oil wells materially.

While I usually employ my apparatus and process by alternately allowing the well pocket to fill and expelling the oil therefrom, still where I find that the oil feeds into the pocket rapidly enough, as when under sufficient natural pressure, either gaseous or hydrostatic, I so proportion the rate of inflow of the pressure medium, its degree of pressure and the size and position of the air orifice or orifices that the oil is expelled from the well at the same rate that it enters, thus causing the apparatus and process to act continuously instead of in cycles.

And it will be seen also that my apparatus and process operate with what I may term a differential volume of pressure medium, that is to say, a greater volume on the oil in the well and a lesser volume on the oil in the discharge pipe, so that while the lifting action of the pressure medium in the discharge pipe actively assists and cooperates with the greater volume in the well, yet it does not prevent the normal operation of displacement of the oil in the well, but hastens that operation by its tendency to constantly lift the oil in the discharge pipe pursuant to its law of effort to travel in the direction of least resistance, and also lifts it higher.

This invention applies equally to the elevating of water from wells. There is always more or less water in oil wells and gas wells. For many conditions this device would be particularly satisfactory in elevating water from water wells.

I have also found it advantageous to stop the flow in the discharge pipe when the well has been almost emptied, in order to minimize the formation of emulsions.

Finally, it is to be understood that my invention, both method and apparatus, is useful for the removal of liquids generally from wells, whether the fluid be oil or water or a mixture of both. The terms "fluid", "liquid", "oil" and "water" as used herein carry this several fold meaning, no matter which word is used.

Having thus set forth my apparatus and its mode of operation and incidentally my process I will now further refer to the process alone.

It will be seen that this method of removing oil from oil wells consists, first, in putting under pressure or compression a pressure medium; second, in conveying the major portion or volume of this pressure medium into contact with the oil in the well to displace it from the well proper into a discharging instrumentality; third, in introducing the minor portion or volume of such pressure medium into such discharging instrumentality to cause a lifting effect on the oil therein.

Having thus fully described my invention, what I claim as new and desire to secure by Letters Patent, is:—

1. An apparatus for removing oil from wells comprising a pipe for conveying a pressure medium into the well, a discharge pipe adapted to extend into the well and the oil therein and having an orifice for the admission of a minor portion or volume of the pressure medium and an exhaust pipe adapted to communicate with the interior of the well to draw off the major volume or portions of the pressure medium after an oil discharging operation in the well.

2. An apparatus for removing oil from oil wells comprising a casing adapted to be inserted in an oil well having one end open and the other closed, a pressure medium supply pipe, a discharge pipe and exhaust pipe all connected with the closed end of the casing and the discharge pipe adapted to extend into the well and the oil therein, and suitable valves to open and close said respective pipes.

3. In an apparatus for removing oil from wells, a discharge pipe adapted to be extended into an oil well having an orifice for the admission of pressure fluid, of a pressure medium pipe adapted to supply such medium to the well and having a branch which connects with said orifice in the discharge pipe.

4. The combination, with an oil well, of a casing adapted to enter therein having the lower end open and the upper end closed, a pressure medium supply pipe, a discharge pipe and an exhaust pipe connected with the closed end and each having a valve, the discharge pipe extending into the well and the oil therein and having one or more orifices adapted to admit to it a minimum portion or volume of the pressure fluid delivered into the casing by the fluid pipe, one of such orifices being located below the minimum level to which the oil may be raised in the discharge pipe by the action of the major portion or volume of the pressure medium.

5. In an apparatus for removing oil from wells, a discharge pipe adapted to be extended into an oil well having an orifice for the admission of pressure fluid, of a pressure medium pipe adapted to supply such medium to a well, and a pipe connecting with the interior of the discharge pipe through said orifice and adapted to receive a part of the pressure medium and introduce the same into the discharge pipe.

6. In an apparatus for removing oil from wells, a discharge pipe adapted to extend into an oil well, a pressure medium pipe to supply such medium to the well, and a smaller pipe adapted to receive such pressure medium at one end and to discharge it from the other into the discharge pipe below the minimum level to which the oil may rise in such discharge pipe by the displacement action of the pressure medium in the well.

7. The herein described method of removing oil from wells, consisting, first, in introducing and confining in the well a pressure medium; in dividing such medium into a major and a minor portion or volume, the major portion producing a displacing action on the oil in the well and the minor portion producing a lifting action on the displaced oil; and next in exhausting the major portion of the medium after a discharging oil operation.

8. The herein described method of removing oil from wells consisting in introducing into such a well a pressure medium; in dividing the medium into a major and a minor portion or volume; in applying such major volume upon the oil in the well to produce a displacement action by which a portion of the oil is elevated in a discharging column and in introducing such minor volume into such discharging column, whereby the major portion of the pressure medium displaces the oil and the minor volume accelerates the movement of the discharging column; and next in exhausting the major portion of the pressure medium after an oil discharging operation.

9. The herein described method of removing oil from wells consisting in introducing and confining in the well a quantity of pressure medium, in dividing such medium into a major and a minor volume; in utilizing the major volume to displace the oil in the well and create a rising column; in permeating the pores of the productive strata with portions of such major volume; in introducing such minor volume into such rising column; and in exhausting the major volume from the well after the displacement operation is effected to cause a reaction of the pressure medium in the soil pores to accelerate the reflow of the oil into the well.

In testimony whereof, I affix my signature.

IRWIN L. DUNN.